US011292525B2

(12) United States Patent
Ebisumoto et al.

(10) Patent No.: US 11,292,525 B2
(45) Date of Patent: Apr. 5, 2022

(54) FRONT VEHICLE-BODY STRUCTURE OF VEHICLE

(71) Applicant: MAZDA MOTOR CORPORATION, Hiroshima (JP)

(72) Inventors: Keisuke Ebisumoto, Aki-gun (JP); Tadashi Yamazaki, Aki-gun (JP); Manabu Tatsuda, Aki-gun (JP); Ippei Kuroda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/004,578

(22) Filed: Aug. 27, 2020

(65) Prior Publication Data

US 2021/0061370 A1    Mar. 4, 2021

(30) Foreign Application Priority Data

Sep. 3, 2019   (JP) .............................. JP2019-160531

(51) Int. Cl.
*B62D 25/02* (2006.01)
*B62D 25/20* (2006.01)
*B62D 27/02* (2006.01)

(52) U.S. Cl.
CPC ....... *B62D 25/025* (2013.01); *B62D 25/2036* (2013.01); *B62D 27/023* (2013.01)

(58) Field of Classification Search
CPC ..... B62D 25/025; B62D 25/20; B62D 27/023

USPC ..... 296/209, 193.07, 203.01, 203.03, 29, 30
See application file for complete search history.

(56) References Cited

U.S. PATENT DOCUMENTS

| 9,783,239 B2* | 10/2017 | Iyoshi | B62D 25/04 |
| 2011/0175399 A1* | 7/2011 | Nakano | B62D 25/025 |
| | | | 296/193.05 |

FOREIGN PATENT DOCUMENTS

JP         2015-009613 A    1/2015

* cited by examiner

*Primary Examiner* — Dennis H Pedder
(74) *Attorney, Agent, or Firm* — Studebaker & Brackett PC

(57) ABSTRACT

A front vehicle-body structure for appropriately dispersing a collision load includes a floor panel; a side sill; a floor frame extending in a front-rear direction on a vehicle-width-direction inner side of the side sill; and a first cross member connecting the side sill and the floor frame to each other in the vehicle width direction. The side sill has a raised wall and an upper wall portion positioned on the vehicle-width-direction inner side in a cross-section orthogonally intersecting with the front-rear direction and extending in an up-down direction, a corner extending in the front-rear direction is formed between the raised wall and the upper wall portion, and a first joint member and a corner reinforcement member that reinforce the raised wall and the corner are provided at a position to which the first cross member is connected in the front-rear direction on an inner side of the side sill.

15 Claims, 10 Drawing Sheets

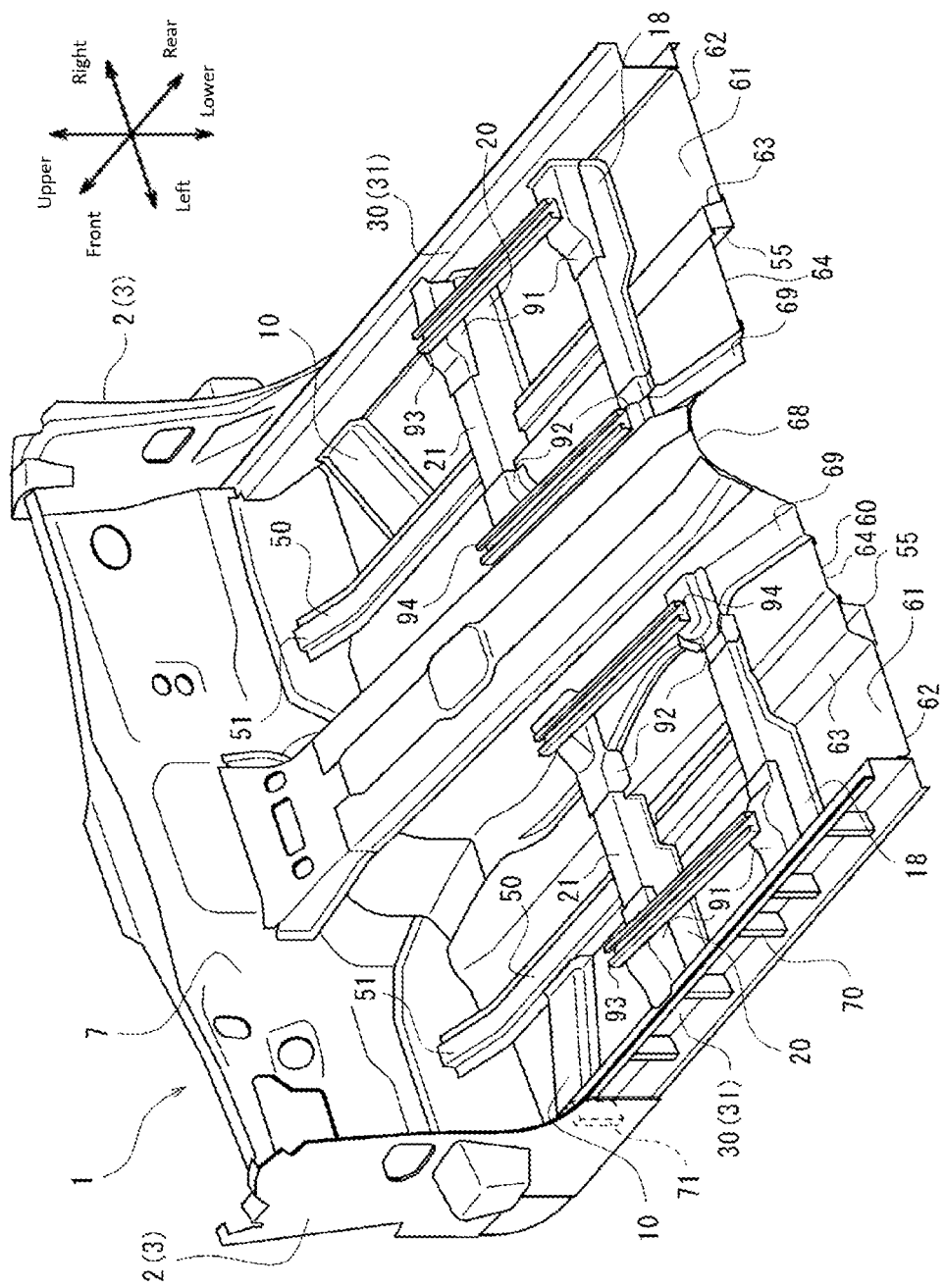
[Fig.1]

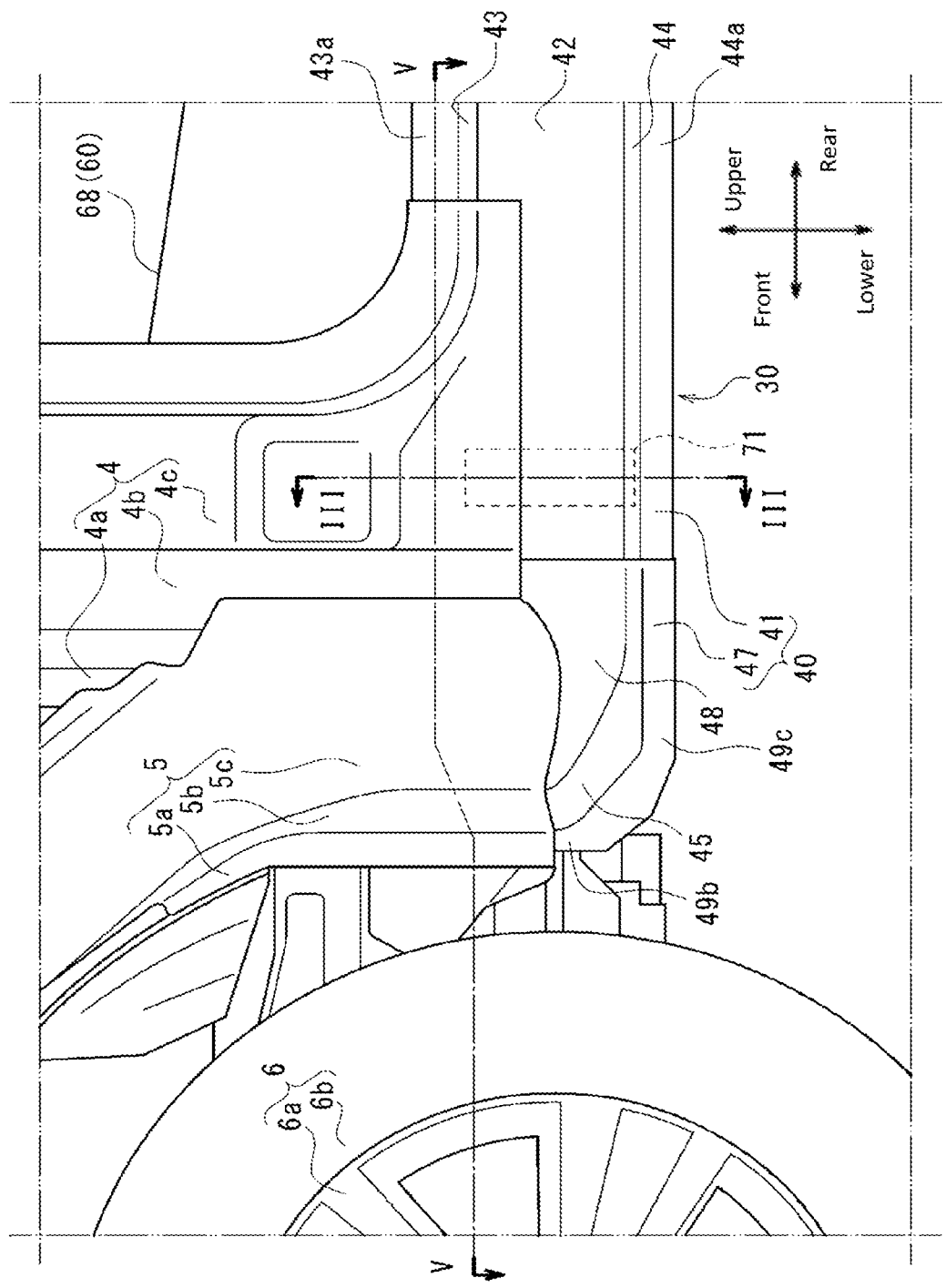
[Fig. 2]

[Fig.3]
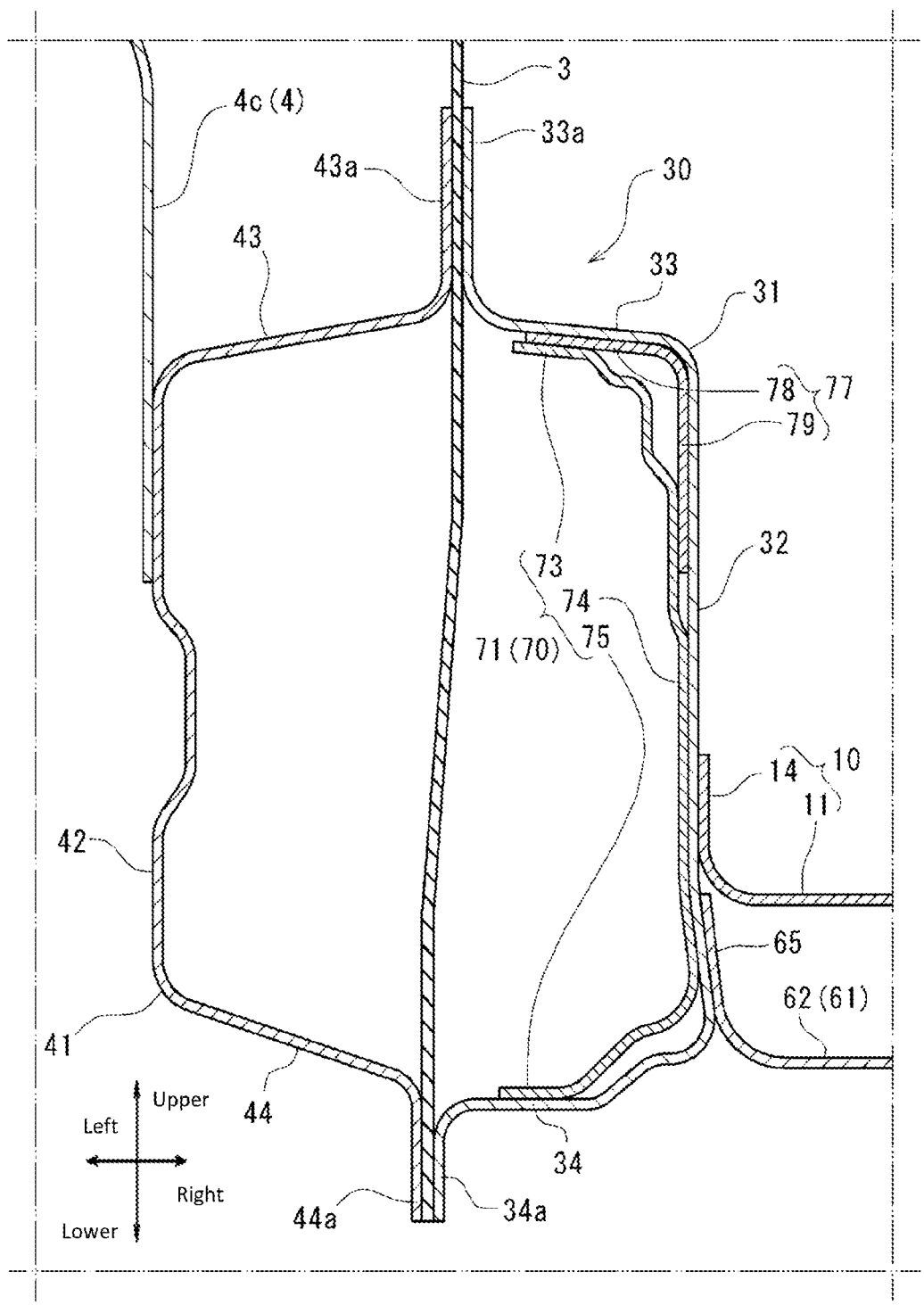

[Fig.4]
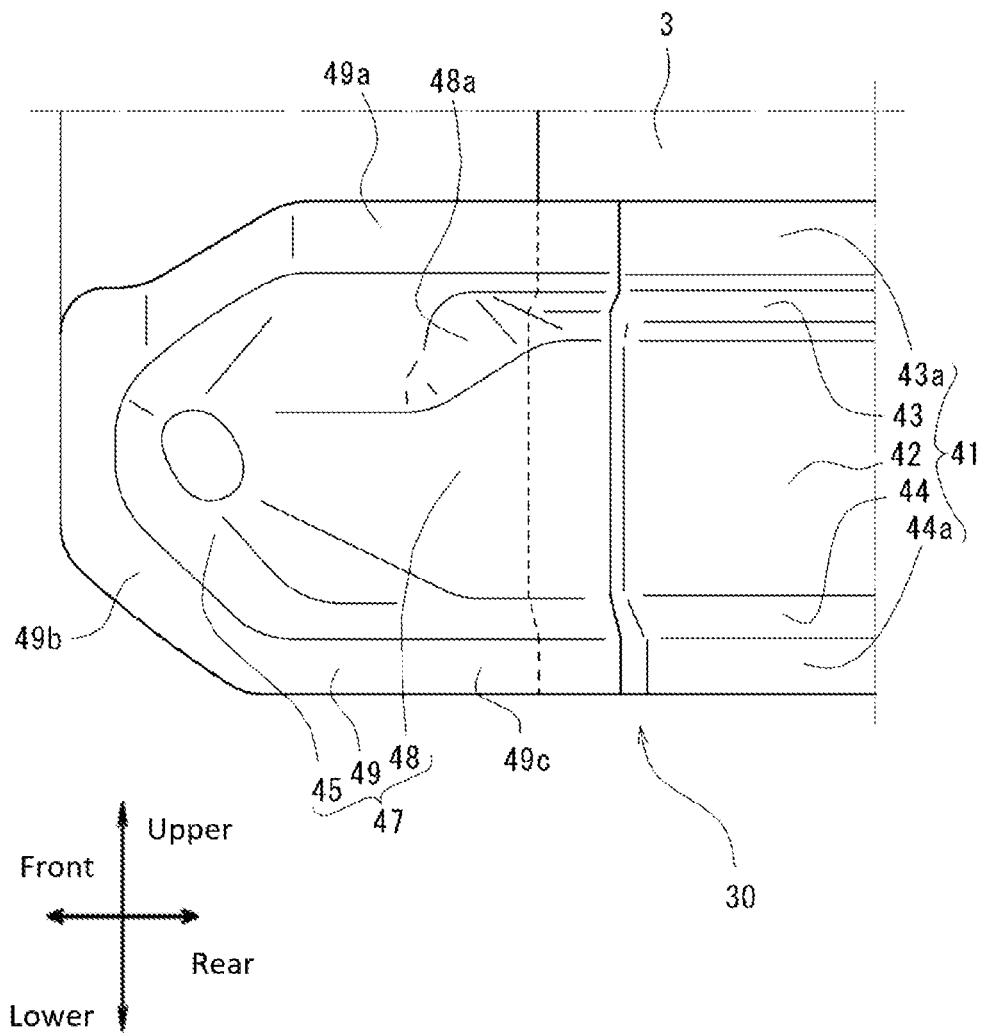

[Fig.5]
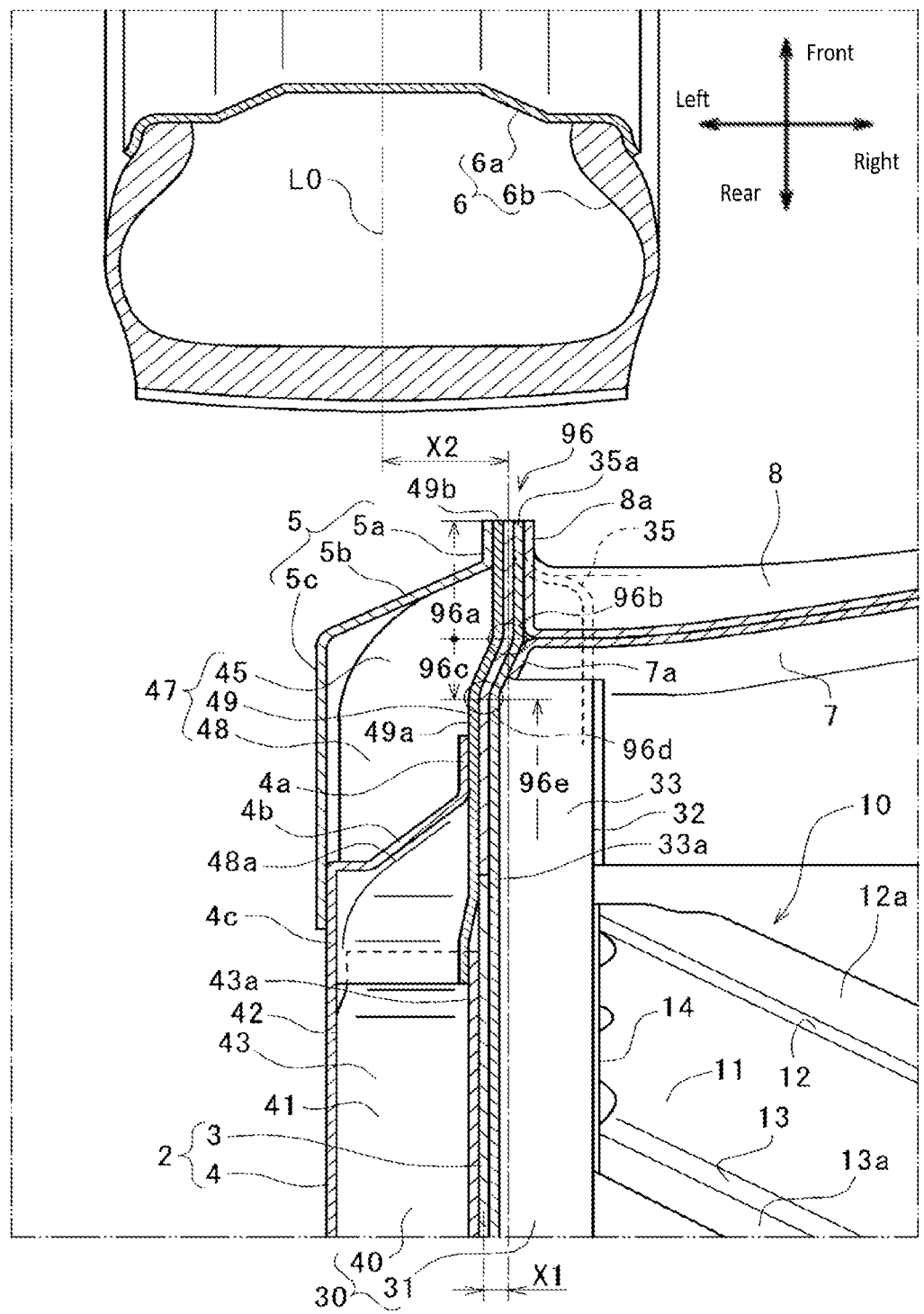

[Fig.6]
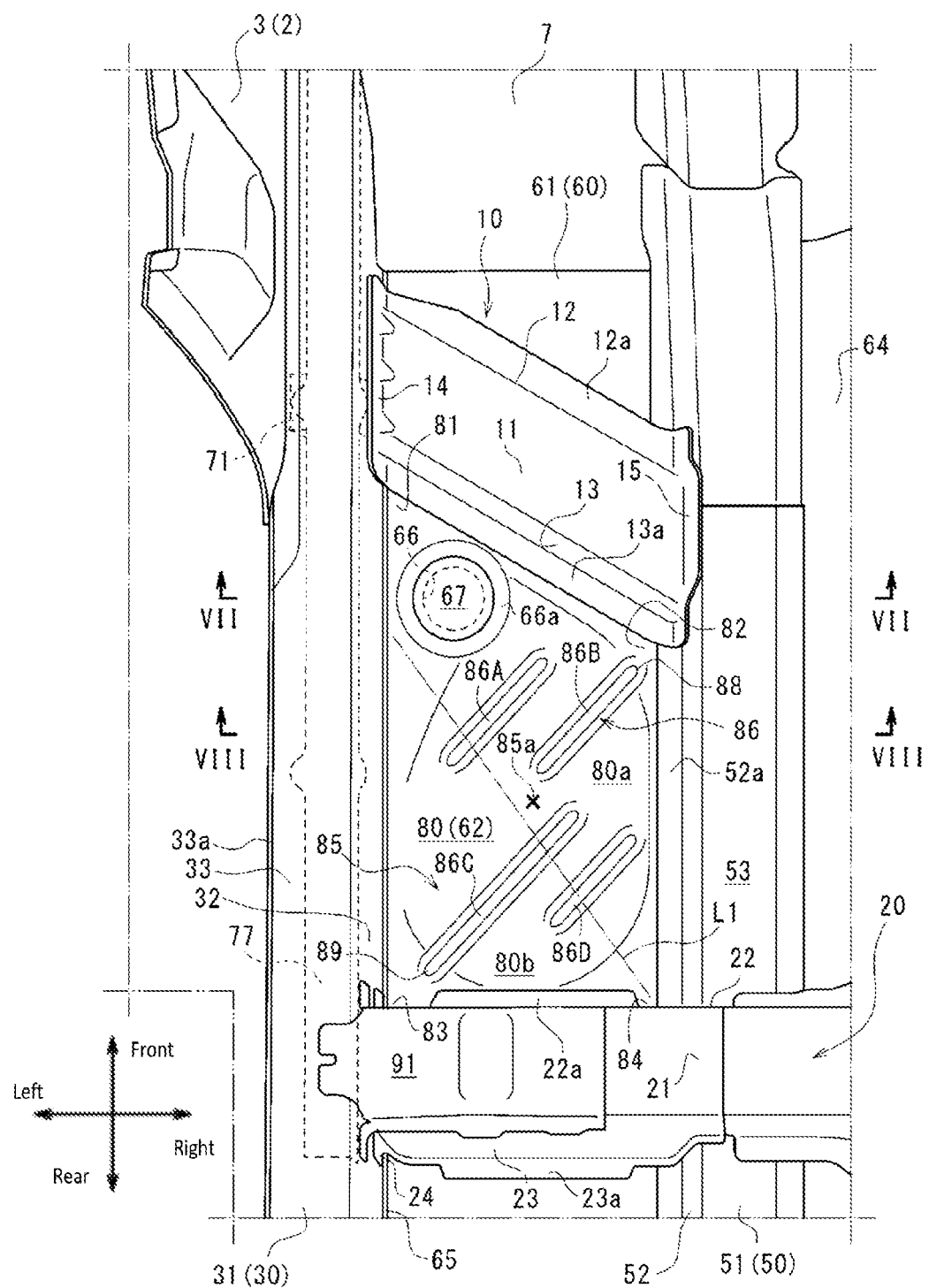

[Fig. 7]
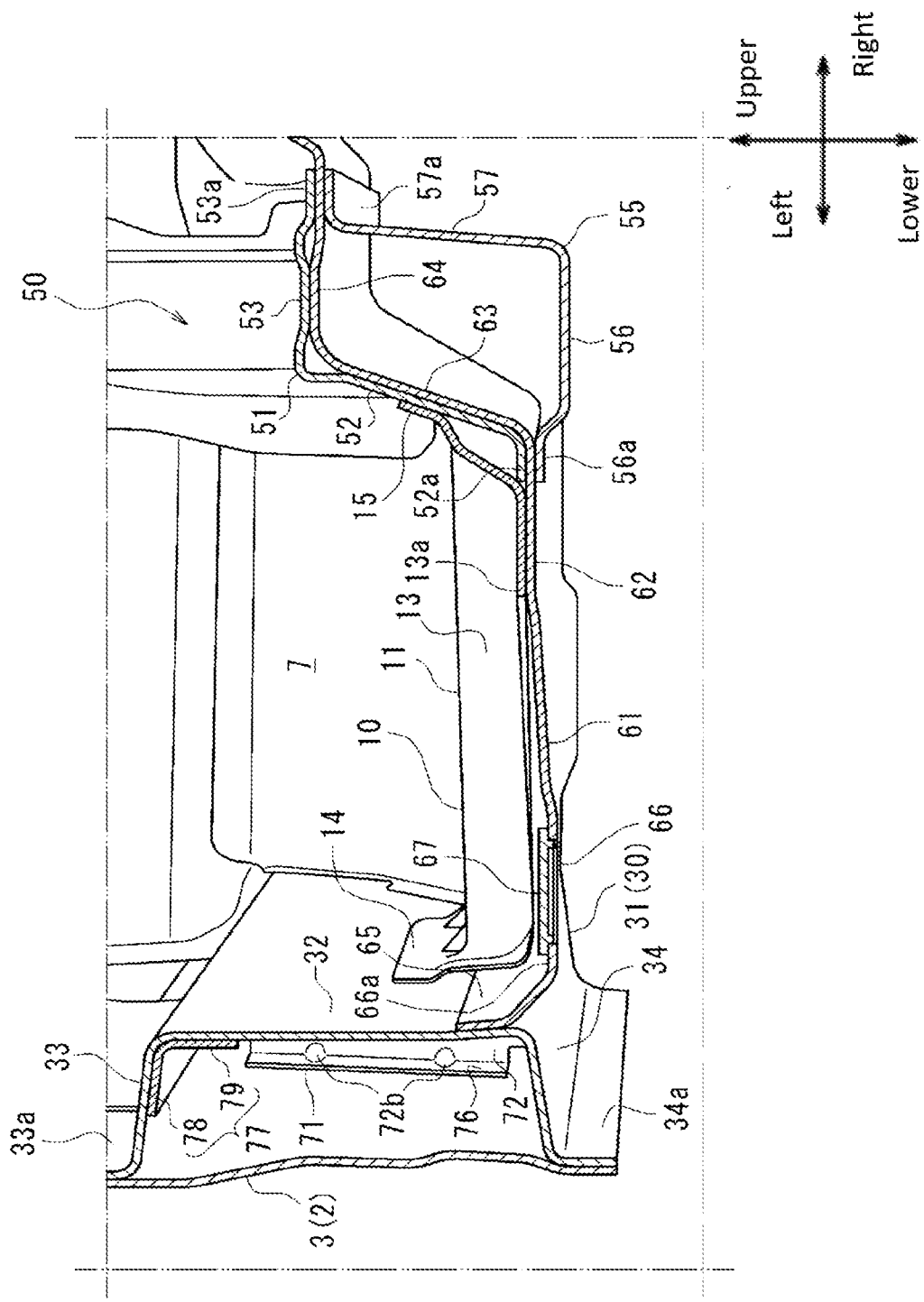

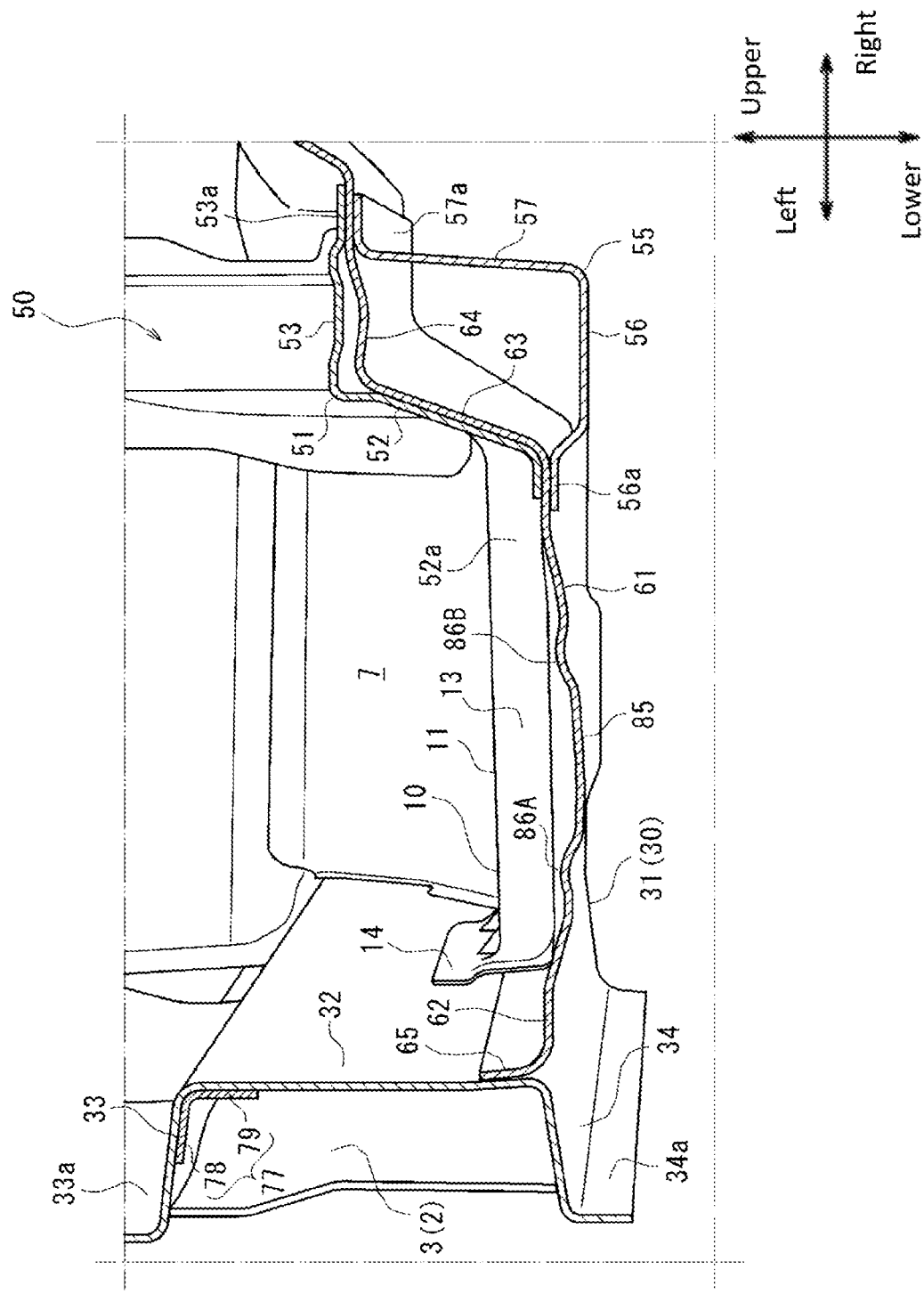
[Fig. 8]

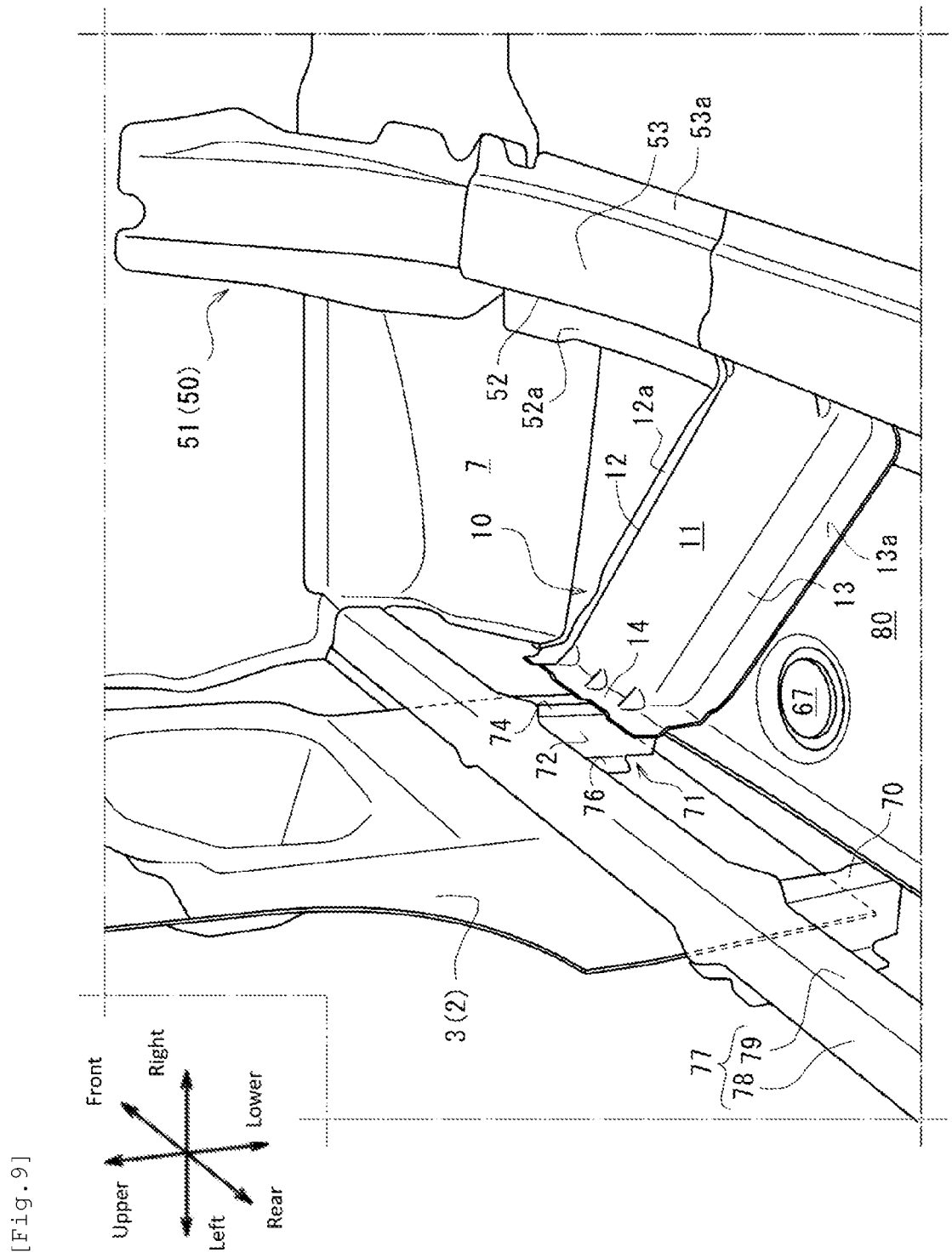
[Fig. 9]

[Fig.10]
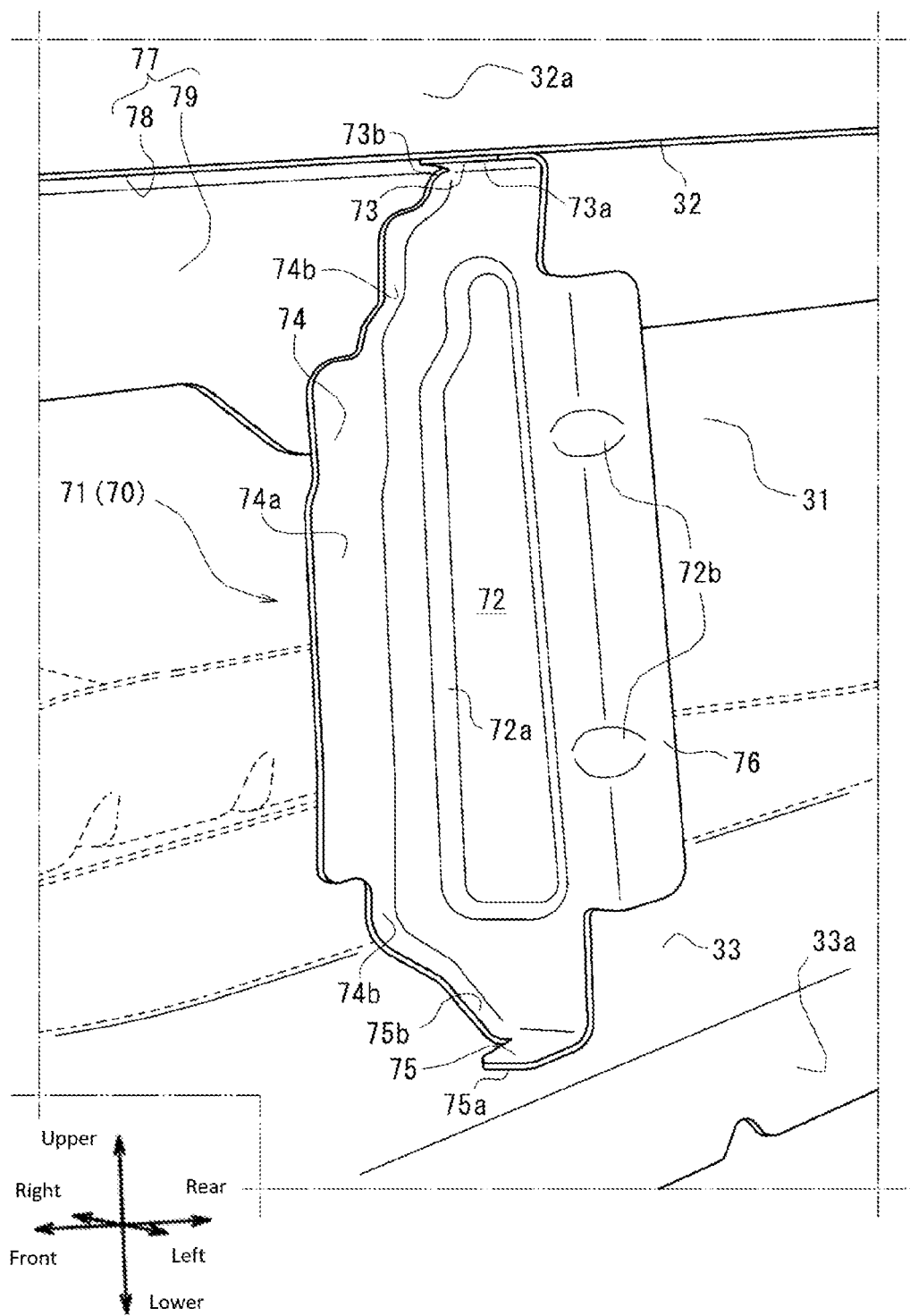

FRONT VEHICLE-BODY STRUCTURE OF VEHICLE

TECHNICAL FIELD

The present disclosure relates to a front vehicle-body structure of a vehicle.

BACKGROUND ART

A front vehicle-body structure of a vehicle including a floor panel, side sills extending in the front-rear direction on both side portions of the floor panel, a floor frame extending in the front-rear direction on the vehicle-width-direction inner side of the side sills, a first cross member connecting the side sills and the floor frame to each other in the vehicle width direction on a front portion of the floor panel, and a second cross member connecting the side sills and the floor frame to each other in the vehicle width direction on the rear side of the first cross member is known, as described, for example, see Japanese Patent Laid-Open No. 2015-009613.

As one collision aspect, a so-called small overlap collision in which a collision object overlaps with a region on the outer side of a front side frame of a vehicle in the vehicle width direction is known. In the case of the small overlap collision, by a load input by the collision object, a front wheel disposed in the overlapping region relatively retreats with respect to a vehicle body, and the collision load acts on a hinge pillar and a side sill from the front wheel.

The first cross member in Japanese Patent Laid-Open No. 2015-009613 extends in a direction inclined to the vehicle-width-direction inner side toward the rear side, and the collision load toward the rear side is planned to be also transmitted to the floor frame positioned on the vehicle-width-direction inner side.

SUMMARY

In order to cause the first cross member according to the related art to function as a load dispersion route, the first cross member needs to be fixed to the side sill, which performs an inward falling behavior of falling to the vehicle-width-direction inner side at the time of a small overlap collision, so as to support a place near an upper surface. In other words, the cross-section of the first cross member needs to be secured to a place near the upper surface of the side sill, and a further device is needed in terms of aiming for compatibility with the weight saving of the vehicle body.

Accordingly, the present disclosure provides a front vehicle-body structure of a vehicle capable of appropriately dispersing a collision load in a small overlap collision to a first cross member from a side sill while suppressing the increase of weight.

A front vehicle-body structure of a vehicle according the disclosure of the present application is characterized in that the front vehicle-body structure includes a floor panel; a side sill extending in a front-rear direction on a vehicle-width-direction outer end portion of the floor panel, a cross-section of the side sill orthogonally intersecting with the front-rear direction being formed as a closed cross-section; a floor frame extending in the front-rear direction on a vehicle-width-direction inner side of the side sill, a cross-section of the floor frame orthogonally intersecting with the front-rear direction being formed as a closed cross-section together with the floor panel; and a cross member connecting the side sill and the floor frame to each other in a vehicle width direction, a cross-section of the cross member orthogonally intersecting with the vehicle width direction being formed as a closed cross-section together with the floor panel. In the front vehicle-body structure, the side sill has an inner surface, which is positioned on the vehicle-width-direction inner side in the cross-section orthogonally intersecting with the front-rear direction and which extends in an up-down direction, and an upper surface positioned on a top portion and extending in the vehicle width direction, a corner extending in the front-rear direction is formed between the inner surface and the upper surface, and a reinforcement member that reinforces the inner surface and the corner is provided at a position to which the cross member is connected in the front-rear direction on an inner side of the side sill.

According to the present disclosure, when the collision load from the front side that acts on the side sill at the time of a collision (for example, a small overlap collision) is transmitted to the vehicle-width-direction inner side via the cross member, the sectional deformation of the side sill can be suppressed by the reinforcement member. As a result, the collision load is efficiently transmitted to the cross member and is also transmitted to the floor frame via the cross member, and hence the collision load can be dispersed to the side sill, the cross member, and the floor frame. There is no need to secure the cross-section of the cross member to the place near the upper surface of the side sill. As a result, the deformation of the side sill is suppressed while suppressing the increase of weight of the cross member, and the reduction of the vehicle cabin space at the time of a collision is easily suppressed.

For example, the reinforcement member may include: a joint member that defines the inner side of the side sill in the front-rear direction and has a peripheral portion connected to the inner surface and the upper surface; and a corner reinforcement member extending in the front-rear direction along the corner.

According to this configuration, the crush of the shape of the corner is easily suppressed by the corner reinforcement member while suppressing the out of plane deformation of the inner surface and the upper surface of the side sill by the joint member. Therefore, also at the time of a collision, the cross-sectional shape of the side sill can be easily maintained, and the collision load can be even more effectively transmitted to the cross member and the floor frame by the reinforcement member.

For example, the cross member may be connected to the joint member via an inner surface of the side sill.

According to this configuration, the collision load is transmitted from the side sill to the cross member via the joint member more effectively.

For example, the corner reinforcement member may be joined to the side sill together with the joint member.

According to this configuration, the sectional deformation of the side sill is even more easily suppressed by a synergistic effect between the reinforcement effect by the corner reinforcement member and the reinforcement effect by the joint member.

For example, the cross member may have an end portion connected to the side sill and positioned below a center of the side sill in the up-down direction.

According to this configuration, the side sill is connected to the cross member at a place below the center in the up-down direction. Therefore, when an inward falling deformation in which the upper side deforms to the vehicle-width-direction inner side by using the connected lower portion as the starting point easily occurs, the present disclosure is suitably carried out. In other words, the inward falling deformation is associated with the deformation of the cross-section. However, according to the present disclosure, the sectional deformation of the side sill is suppressed by the reinforcement member, and hence the inward falling deformation of which starting point is the lower portion does not easily occur.

According to the front vehicle-body structure of the vehicle according to the present disclosure, the collision load in the small overlap collision can be appropriately dispersed to the first cross member from the side sill while suppressing the increase of weight.

BRIEF DESCRIPTION OF THE DRAWINGS

FIG. 1 is a perspective view illustrating a front vehicle-body structure of a vehicle according to one embodiment of the present disclosure;

FIG. 2 is a side view of the front vehicle-body structure of the vehicle;

FIG. 3 is a cross-sectional view taken along line in FIG. 2;

FIG. 4 is a side view illustrating the periphery of a front-end portion of a side sill in an enlarged manner;

FIG. 5 is a cross-sectional view taken along line V-V in FIG. 2;

FIG. 6 is a plan view illustrating a front portion on one side of a floor panel in the vehicle width direction in an enlarged manner;

FIG. 7 is a cross-sectional view taken along line VII-VII in FIG. 6;

FIG. 8 is a cross-sectional view taken along line VIII-VIII in FIG. 6;

FIG. 9 is a perspective view of the periphery of a first cross member seen from the rear side; and FIG. 10 is a perspective view of an inner side of a side sill inner portion seen from the front side.

DETAILED DESCRIPTION

A front vehicle-body structure of a vehicle according to one embodiment of the present disclosure is described below with reference to the accompanying drawings. In the description below, the front vehicle-body structure on the left side in the vehicle width direction is mainly described, but the same applies for the right side. The members described below can be each formed by press molding a steel plate, and may be joined by spot welding, for example.

FIG. 1 is a perspective view of a front vehicle-body structure of a vehicle 1 according to this embodiment seen from the rear side, and FIG. 2 is a side view of the same. As illustrated in FIG. 1, the vehicle 1 including the front vehicle-body structure according to this embodiment includes a floor panel 60 forming a floor surface of a space in a vehicle cabin, a pair of side sills 30 extending in the front-rear direction along both side portions of the floor panel 60 in the vehicle width direction, and a dash panel 7 disposed on the front side of the floor panel 60. By the dash panel 7, the space in the vehicle cabin and an engine compartment are separated from each other in the front-rear direction.

Each of the side sills 30 has a side sill inner portion 31 having a cross-sectional shape having a hat-shaped profile opened to the vehicle-width-direction outer side in a cross-section orthogonally intersecting with the front-rear direction, and a side sill outer portion 40 (see FIG. 2) having a cross-sectional shape having a hat-shaped profile opened to the vehicle-width-direction inner side in a cross-section orthogonally intersecting with the front-rear direction. The side sill inner portion 31 and the side sill outer portion 40 form a closed cross-section continuous in the front-rear direction by being joined to each other.

The vehicle 1 further includes a pair of hinge pillars 2 rising up from the front-end portions of the left and right side sills 30 and extending in the up-down direction. Each of the hinge pillars 2 has a hinge pillar inner 3 positioned on the vehicle-width-direction inner side and a hinge pillar outer 4 (see FIG. 2) positioned on the vehicle-width-direction outer side. The hinge pillar inner 3 is positioned between the side sill inner portion 31 and the side sill outer portion 40. The hinge pillar outer 4 is joined to the side sill outer portion 40 from the vehicle-width-direction outer side. The dash panel 7 is installed between the pair of hinge pillars 2.

The floor panel 60 has a floor tunnel 68 positioned on a central portion in the vehicle width direction, and a pair of bottom surface portions 61 positioned on both side portions thereof. The floor tunnel 68 extends in the front-rear direction. A cross-sectional shape of the floor tunnel 68 orthogonally intersecting with the front-rear direction is formed in a U-shape opened downward and bulges to the upper side with respect to the bottom surface portions 61. The floor tunnel 68 has step-up portions 69 raised from the bottom surface portions 61 by one step on both edge portions in the vehicle width direction.

A pair of left and right floor frames 50 extending in the front-rear direction are joined to the bottom surface portions 61 of the floor panel 60. Each of the floor frames 50 is disposed between the floor tunnel 68 and each of the side sills 30 in the vehicle width direction. In other words, the floor frames 50 are disposed on the inner side with respect to the side sills 30 in the vehicle width direction. The floor frames 50 are connected to the front-end portions of the side sills 30 via torque boxes 8 (see FIG. 5) extending in the vehicle width direction on a front-end portion of the floor panel 60.

On the upper surface of each of the bottom surface portions 61, a first cross member 10 connecting the side sill 30 and the floor frame 50 to each other in the vehicle width direction, and a second cross member 20 and a third cross member 18 connecting the side sill 30, the floor frame 50, and the floor tunnel 68 to each other in the vehicle width direction are joined to each other.

The first cross member 10 extends in a direction inclined to the rear side toward the vehicle-width-direction inner side, and an end portion joined to the side sill inner portion 31 overlaps with the hinge pillar 2 in the front-rear direction when seen from the vehicle-width-direction outer side. The second cross member 20 is disposed so as to be spaced apart from the first cross member 10 on the rear side of the first cross member 10. The third cross member 18 is disposed so as to be spaced apart from the second cross member 20 on the rear side of the second cross member 20.

As illustrated in FIG. 2, the vehicle 1 has a connecting frame 5 connecting a lower portion of the hinge pillar outer 4 and the front-end portion of the side sill 30 and a lower portion of an apron reinforcement (not shown) extending from an upper portion of the hinge pillar 2 to the front side to each other in a bracing manner. The apron reinforcement supports a suspension housing (not shown) on which a front suspension (not shown) is mounted that supports front wheels 6 positioned on the front side of the side sills 30 in a swingable manner Each of the front wheels 6 is formed by assembling a tire 6b on the outer peripheral portion of a wheel 6a.

The hinge pillar outer 4 has a front flange 4a extending to the front side at a front-end portion, an inclined wall portion 4b extending from a rear end portion of the front flange 4a in a direction inclined to the vehicle-width-direction outer side toward the rear side, and a front-rear wall portion 4c extending from a rear end portion of the inclined wall portion 4b to the rear side on the vehicle-width-direction outer side of the side sill outer portion 40.

The connecting frame 5 has a front flange 5a extending to the front side on a front-end portion, an inclined wall portion 5b extending from a rear end portion of the front flange 5a in a direction inclined to the vehicle-width-direction outer side toward the rear side, and a front-rear wall portion 5c extending from a rear end portion thereof to the rear side on the vehicle-width-direction outer side of the side sill outer front portion 40. A rear end portion of the front-rear wall portion 5c of the connecting frame 5 is joined to the front-rear wall portion 4c of the hinge pillar outer 4 from the vehicle-width-direction outer side.

[Side Sill]

The side sill outer portion 40 is divided into two in the front-rear direction, in other words, a side sill outer portion body 41 extending from the hinge pillar 2 to the rear side, and a side sill outer portion front portion 47 positioned on the front side thereof and forming a front-end portion of the side sill outer portion 40. The side sill outer portion body 41 is inserted into and joined to the inner side of a rear end portion of the side sill outer portion front portion 47 at a front-end portion thereof.

FIG. 3 is a cross-sectional view taken along line in FIG. 2, and illustrates a cross-section orthogonally intersecting with the front-rear direction of a portion in which the side sill outer portion body 41 is provided out of the side sill 30. As illustrated in FIG. 3, the side sill inner portion 31 has a raised wall 32, which is extending in the up-down direction and to which a floor panel flange 65 described below is joined from the vehicle-width-direction inner side, an upper wall portion 33 and a lower wall portion 34 extending from an upper edge portion and a lower edge portion thereof to the vehicle-width-direction outer side, an upper flange 33a extending from an edge portion of the upper wall portion 33 on the vehicle-width-direction outer side thereof to the upper side, and a lower flange 34a extending downward from an edge portion of the lower wall portion 34 on the vehicle-width-direction outer side thereof.

The side sill outer portion body 41 has a raised wall 42, which is extending in the up-down direction and to which the hinge pillar outer 4 is joined from the vehicle-width-direction outer side, an upper wall portion 43 and a lower wall portion 44 extending from an upper edge portion and a lower edge portion thereof to the vehicle-width-direction inner side, an upper flange 43a extending from an edge portion of the upper wall portion 43 on the vehicle-width-direction inner side thereof to the upper side, and a lower flange 44a extending downward from an edge portion of the lower wall portion 44 on the vehicle-width-direction inner side thereof.

FIG. 4 is a side view illustrating the periphery of the side sill outer portion front portion 47 out of FIG. 2 in an enlarged manner. In FIG. 4, the hinge pillar outer 4 and the connecting frame 5 are omitted. As illustrated in FIG. 4, the side sill outer portion front portion 47 is formed to have a cross-sectional shape having a hat-shaped profile extending to the front side so as to be continuous with a cross-sectional shape of the side sill outer portion body 41.

Specifically, the side sill outer portion front portion 47 has a flange portion 49 joined to the hinge pillar inner 3 from the vehicle-width-direction outer side, and a bulge 48 bulging to the vehicle-width-direction outer side with respect to the flange portion 49. The bulge 48 extends to the front side so as to be continuous with the raised wall 42, the upper wall portion 43, and the lower wall portion 44 of the side sill outer portion body 41. On an upper portion of a rear-half portion of the bulge 48, an inclined wall portion 48a (also see FIG. 5) inclined to the vehicle-width-direction outer side toward the rear side is provided in a recessed manner.

The flange portion 49 has an upper flange 49a and a lower flange 49c extending to the front side so as to be continuous with the upper flange 43a and the lower flange 44a of the side sill outer portion body 41.

FIG. 5 is a cross-sectional view taken along line V-V in FIG. 2 and illustrates a cross-section perpendicular to the up-down direction along the upper flanges 33a, 43a, and 49a of the side sill 30. As illustrated in FIG. 5, the side sill inner portion 31 has a curved portion 35 curved to the vehicle-width-direction outer side on a front-end portion. In addition, the cross-section depth of a cross-section having a hat-shaped profile in the vehicle width direction gradually decreases via the curved portion 35. At a front-end portion, the cross-section depth becomes zero and the cross-sectional shape having a hat-shaped profile terminates. The side sill inner portion 31 has a front flange 35a extending from a front edge portion of the curved portion 35 to the front side. In the side sill inner portion 31, the upper flange 33a, the front flange 35a, and the lower flange 34a are continuous at a peripheral portion.

Similarly, the bulge 48 of the side sill outer portion front portion 47 has a curved portion 45 curved to the vehicle-width-direction inner side on a front-end portion, the cross-section depth of a cross-section having a hat-shaped profile in the vehicle width direction gradually decreases via the curved portion 45, and the cross-section terminates at a front-end portion as a result of the cross-section depth becoming zero. The side sill outer portion front portion 47 has a front flange 49b extending from a front edge portion of the bulge 48 to the front side. As illustrated in FIG. 4, in the side sill outer portion front portion 47, the upper flange 49a, the front flange 49b, and the lower flange 49c are continuous at a peripheral portion.

As illustrated in FIG. 3 and FIG. 5, the side sill inner portion 31 and the side sill outer portion 40 are joined to each other in the vehicle width direction by interposing the hinge pillar inner 3 therebetween. Specifically, regarding the side sill inner portion 31 and the side sill outer portion body 41, the upper flanges 33a and 43a thereof are joined to each other such that three pieces are put together by interposing the hinge pillar inner 3 between the upper flanges 33a and 43a, and the lower flanges 34a and 44a are joined to each other such that three pieces are put together by interposing the hinge pillar inner 3 between the lower flanges 34a and 44a.

Regarding the side sill inner portion 31 and the side sill outer portion front portion 47, the upper flanges 33a and 49a thereof are joined to each other such that three pieces are put together by interposing the hinge pillar inner 3 between the upper flanges 33a and 49a, the front flanges 35a and 49b thereof are joined to each other such that three pieces are put together by interposing the hinge pillar inner 3 between the front flanges 35a and 49b, and the lower flanges 34a and 49c are joined to each other such that three pieces are put together by interposing the hinge pillar inner 3 between the lower flanges 34a and 49c.

With reference to FIG. 5, a joined portion 96 at which the upper flanges 33a and 49a are joined to each other out of joined portions between the hinge pillar inner 3 and the side sill outer portion front portion 47 is described. The joined portion 96 has a first joined portion 96a extending from a front-end portion to the rear side, a second joined portion 96c extending from a rear end portion of the first joined portion 96a in a direction inclined to the vehicle-width-direction outer side toward the rear side via a first bent portion 96b bent to the vehicle-width-direction outer side, and a third joined portion 96e extending from a rear end portion of the second joined portion 96c to the rear side via a second bent portion 96d bent to the vehicle-width-direction inner side.

In other words, the joined portion 96 is offset from the first joined portion 96a extending to be parallel to the front-rear direction toward the rear side to the vehicle-width-direction outer side by an offset amount X1 to the third joined portion 96e extending to be parallel to the front-rear direction via the second joined portion 96c extending in the direction inclined to the vehicle-width-direction outer side toward the rear side.

The joined portion 96 is positioned to be closer to the vehicle-width-direction inner side than a center line L0 in the vehicle width direction of the wheel 6a. The first joined portion 96a is positioned on the vehicle-width-direction innermost side out of the joined portion 96, and hence an offset amount X2 to the vehicle-width-direction inner side with respect to the center line L0 is large. In the side sill 30, the joined portion 96 is positioned to be biased to the vehicle-width-direction inner side, and the percentage of the side sill outer portion 40 in the side sill 30 is greater on the front-end portion.

The first bent portion 96b is positioned on the front side of the inclined wall portion 48a in the front-rear direction, and the upper flanges 33a and 49a are bent to the direction inclined to the vehicle-width-direction outer side toward the rear side. The second bent portion 96d is positioned between the first bent portion 96b and the inclined wall portion 48a in the front-rear direction, and the upper flanges 33a and 49a extending in a direction inclined with respect to the front-rear direction are bent to the vehicle-width-direction inner side toward the rear side so as to extend along the front-rear direction.

The abovementioned description has been described by taking the joined portion 96 at which the upper flanges 33a and 49a are joined to each other out of the joined portions between the hinge pillar inner 3 and the side sill inner portion 31 and the side sill outer portion front portion 47 as an example, but the same applies for a joined portion at which the lower flanges 34a and 49c are joined to each other and the description thereof is omitted.

Out of the joined portion 96, a flange 8a of the torque box 8 is joined to the first joined portion 96a from the vehicle-width-direction inner side, and the front flange 5a of the connecting frame 5 is joined to the first joined portion 96a from the vehicle-width-direction outer side. From the vehicle-width-direction inner side, a flange 7a of the dash panel 7 is joined to the second joined portion 96c out of the joined portion 96 from the vehicle-width-direction inner side. A front flange 4a of the hinge pillar outer 4 is joined to the third joined portion 96e out of the joined portion 96 from the vehicle-width-direction outer side.

The curved portion 45 of the side sill outer portion front portion 47 is positioned so as to be substantially adjacent to the rear side of the inclined wall portion 5b of the connecting frame 5. The inclined wall portion 48a of the side sill outer portion front portion 47 is positioned so as to be substantially adjacent to the rear side of the inclined wall portion 4b of the hinge pillar outer 4.

The side sills 30 is formed such that the buckling strength in the front-rear direction of the side sill outer portion 40 positioned on the vehicle-width-direction outer side is lower than that of the side sill inner portion 31 positioned on the vehicle-width-direction inner side. For example, in this embodiment, a steel plate of which tensile strength is 440 MPa and thickness is 1.4 mm is employed as the side sill outer portion 40, and a steel plate of which tensile strength is 1180 MPa and thickness is 1.2 mm is employed as the side sill inner portion 31.

As described above, regarding the side sill 30, the percentage of the side sill outer portion 40 in the front-end portion is large, and the buckling strength is set to be relatively low. Therefore, when a collision load is received from the front side, the side sill outer portion 40 is preferentially buckled in an easy manner as compared to the side sill inner portion 31.

It is possible to set only the side sill outer portion front portion 47 positioned on the front-end portion out of the side sill outer portion 40 to have a low buckling strength, and the side sill outer portion body 41 may be set to have the same material as the side sill inner portion 31. As a result, when a collision load is received from the front side, the side sill outer portion front portion 47 out of the side sill outer portion 40 is easily buckled in a more efficient manner.

[Floor Panel]

FIG. 6 is a plan view illustrating a front portion of the bottom surface portion 61 on the left side in an enlarged manner. As illustrated in FIG. 6, an opening 66 passing through the bottom surface portion 61 in the up-down direction is formed in the bottom surface portion 61 on the rear side of a portion at which the first cross member 10 and the side sill 30 are joined to each other. The opening 66 is used as a reference hole for when the front vehicle-body structure is assembled, or is also used as a paint supply hole for supplying paint to the upper surface from the lower surface of the floor panel 60 or vice versa when the front vehicle-body structure is electropainted, for example.

FIG. 7 is a cross-sectional view taken along line VII-VII in FIG. 6. As illustrated in FIG. 7, the bottom surface portion 61 has a first bottom surface portion 62 extending in the vehicle width direction between the side sill 30 and the floor frame 50, a raised wall 63 extending from an edge portion of the first bottom surface portion 62 on the vehicle-width-direction inner side thereof in a direction inclined to the vehicle-width-direction inner side toward the upper side, and a second bottom surface portion 64 extending from an upper edge portion of the raised wall 63 to the vehicle-width-direction inner side. The first bottom surface portion 62 is joined to the raised wall 32 of the side sill inner portion 31 from the vehicle-width-direction inner side via the floor panel flange 65 extending from an edge portion on the vehicle-width-direction outer side to the upper side.

To the raised wall 63 and the second bottom surface portion 64 of the floor panel 60, an upper frame 51 is joined from the upper side and a lower frame 55 is joined from the lower side.

[Floor Frame]

The upper frame 51 has an upper-frame raised wall 52 positioned on the vehicle-width-direction outer side of the raised wall 63 and extending along the raised wall 63, and an upper-frame upper-wall portion 53 extending from an upper edge portion thereof to the vehicle-width-direction inner side along the second bottom surface portion 64. The upper-frame raised wall 52 has a lower flange 52a extending from the lower edge portion to the vehicle-width-direction outer side. The upper-frame upper-wall portion 53 has an upper flange 53a further extending from an edge portion on the vehicle-width-direction inner side to the vehicle-width-direction inner side.

The lower frame 55 is positioned below the first bottom surface portion 62, and has a lower-frame lower-wall portion 56 facing the second bottom surface portion 64, and a lower-frame raised wall 57 extending from an edge portion on the vehicle-width-direction inner side thereof to the upper side. The lower-frame lower-wall portion 56 has a lower flange 56a further extending from an edge portion on the vehicle-width-direction outer side to the vehicle-width-direction outer side. The lower-frame raised wall 57 has an upper flange 57a extending from an upper edge portion to the vehicle-width-direction inner side.

The upper frame 51 and the lower frame 55 are joined to each other at end portions on the vehicle-width-direction outer side such that three pieces are put together by interposing the first bottom surface portion 62 between the lower flanges 52a and 56a. The upper frame 51 and the lower frame 55 are joined to each other at end portions on the vehicle-width-direction inner side such that three pieces are put together by interposing the second bottom surface portion 64 between the upper flanges 53a and 57a.

Therefore, on the upper surface side and the lower surface side of the raised wall 63 and the second bottom surface portion 64 of the floor panel 60, closed cross-sections extending in the front-rear direction are formed between the upper frame 51 and the lower frame 55.

[Cross Member]

As illustrated in FIG. 1 and FIG. 6, the first cross member 10, the second cross member 20, and the third cross member 18 each have a cross-sectional shape having a hat-shaped profile opened to the lower side in a cross-sectional shape orthogonally intersecting with the vehicle width direction, and each form a closed cross-section continuous in the vehicle width direction with the bottom surface portion 61 of the floor panel 60.

The first cross member 10 has an upper surface portion 11 facing the first bottom surface portion 62 from the upper side, and a front surface portion 12 and a rear surface portion 13 extending from a front edge portion and a rear edge portion thereof to the lower side. A front flange 12a extending to the front side is formed on a lower edge portion of the front surface portion 12. A rear flange 13a extending to the rear side is formed on a lower edge portion of the rear surface portion 13. The first cross member 10 is joined to the first bottom surface portion 62 of the floor panel 60 via the front flange 12a and the rear flange 13a.

In the first cross member 10, an outer flange 14 extending to the upper side is formed on an end portion on the vehicle-width-direction outer side, and an inner flange 15 extending to the upper side is formed on an end portion on the vehicle-width-direction inner side. The outer flange 14 is provided along edge portions of the upper surface portion 11, the front surface portion 12, and the rear surface portion 13 on the vehicle-width-direction outer side thereof. The inner flange 15 is provided along edge portions of the upper surface portion 11, the front surface portion 12, and the rear surface portion 13 on the vehicle-width-direction inner side thereof.

The outer flange 14, the inner flange 15, the front flange 12a, and the rear flange 13a in the first cross member 10 are formed as an entire periphery flange that is continuous along the entire periphery so as to surround the upper surface portion 11, the front surface portion 12, and the rear surface portion 13.

As illustrated in FIG. 7, in the first cross member 10, the upper surface portion 11 is positioned below an intermediate position of the raised wall 32 of the side sill inner portion 31 in the up-down direction. The first cross member 10 is joined to the raised wall 32 of the side sill inner portion 31 at a place lower than a central position thereof in the up-down direction via the outer flange 14. The first cross member 10 is joined to the upper-frame raised wall 52 at a substantially central position thereof in the up-down direction via the inner flange 15. The raised wall 63 of the floor panel 60 may be added and joined to a joined portion between the inner flange 15 and the upper-frame raised wall 52 such that three pieces are put together.

As illustrated in FIG. 6, the second cross member 20 has an upper surface portion 21 facing the first bottom surface portion 62 and the second bottom surface portion 64 from the upper side, and a front surface portion 22 and a rear surface portion 23 extending to the lower side from a front edge portion and a rear edge portion thereof. On a lower edge portion of the front surface portion 22, a front flange 22a extending to the front side is formed. On a lower edge portion of the rear surface portion 23, a rear flange 23a extending to the rear side is formed. The second cross member 20 is joined to the first bottom surface portion 62, the raised wall 63, and the second bottom surface portion 64 of the floor panel 60 via the front flange 22a and the rear flange 23a.

In the second cross member 20, the upper surface portion 21 is positioned so as to be substantially flush with the step-up portion 69 of the floor tunnel 68 on the vehicle-width-direction inner side, and is positioned above the intermediate position of the raised wall 32 of the side sill inner portion 31 in the up-down direction on the vehicle-width-direction outer side. At an end portion on the vehicle-width-direction outer side, the second cross member 20 is joined to the raised wall 32 of the side sill inner portion 31 from a lower end portion to a place above the intermediate position thereof in the up-down direction. The second cross member 20 is joined to the step-up portion 69 of the floor tunnel 68 at an end portion on the vehicle-width-direction inner side.

The third cross member 18 has a configuration similar to that of the second cross member 20, and detailed description thereof is omitted. The second cross member 20 and the third cross member 18 may be formed by dividing the second cross member 20 and the third cross member 18 into a plurality of members in the vehicle width direction.

A pair of front and rear outer brackets 91 provided between the second cross member 20 and the third cross member 18 and the side sill inner portion 31 are joined to end portions of the second cross member 20 and the third cross member 18 on the vehicle-width-direction outer side thereof, and a pair of front and rear inner brackets 92 provided between the second cross member 20 and the third cross member 18 and the floor tunnel 68 are joined to end portions of the second cross member 20 and the third cross member 18 on the vehicle-width-direction inner side thereof. An outer seat rail 93 is mounted on the pair of front and rear outer brackets 91, and an inner seat rail 94 is mounted on the pair of front and rear inner brackets 92.

[First Bottom Surface Portion]

As illustrated in FIG. 6, in the first bottom surface portion 62, a quadrilateral closed region 80 surrounded by the side sill 30, the floor frame 50, the first cross member 10, and the second cross member 20 on the periphery thereof is defined.

As described above, the first cross member 10 extends to the direction inclined to the vehicle-width-direction inner side toward the rear side. Therefore, in the closed region 80, while a first corner 81 defined by the first cross member 10 and the side sill 30 forms an acute angle, a second corner 82 defined by the first cross member 10 and the floor frame 50 forms an obtuse angle.

Meanwhile, the second cross member 20 extends to be parallel to the vehicle width direction. Therefore, in the closed region 80, a third corner 83 defined by the second cross member 20 and the side sill 30 and a fourth corner 84 defined by the second cross member and the floor frame 50 each form a substantially right angle.

The opening 66 is formed in the first corner 81. With additional reference to FIG. 7, the opening 66 has a hole rim portion on which a flange portion 66a is formed. A cap member 67 is firmly fixed to the flange portion 66a from the upper side. The opening 66 is closed by the cap member 67.

As illustrated in FIG. 6, the closed region 80 has a triangular inner front region 80a positioned on the front side and the vehicle-width-direction inner side and having peripheral portions joined to the first cross member 10 and the floor frame 50, and a triangular outer rear region 80b positioned on the rear side and the vehicle-width-direction outer side thereof and having peripheral portions joined to the second cross member 20 and the side sill 30.

The inner front region 80a is formed to have a high rigidity by having two sides out of the peripheral portions of the triangular shape supported by the first cross member 10 and the floor frame 50. Similarly, the outer rear region 80b is formed to have a high rigidity by having two sides out of the peripheral portions of the triangular shape supported by the second cross member 20 and the side sill 30. Therefore, the closed region 80 is divided into two parts in terms of rigidity, in other words, the inner front region 80a and the outer rear region 80b of which rigidity is enhanced by being supported by different members.

In the closed region 80, the rigidity of the periphery of the opening 66 is also enhanced by the flange portion 66a and the cap member 67 firmly fixed thereto. The opening 66 is positioned to be closer to the first cross member 10 than the side sill 30 at the first corner 81, and the periphery of the opening 66 formed to have a high rigidity is included in the inner front region 80a.

The boundary between the inner front region 80a and the outer rear region 80b is indicated as a virtual line L1. The virtual line L1 extends to a direction inclined to the vehicle-width-direction inner side toward the rear side, and specifically extends from a place between the opening 66 (cap member 67) and the side sill 30 to the fourth corner 84. When the opening 66 is not provided in the closed region 80, the virtual line L1 is formed as a diagonal line connecting the first corner 81 and the fourth corner 84 to each other.

With additional reference to FIG. 8, the closed region 80 has a curved surface portion 85 formed in a curved shape so as to bulge to the lower side in a dome shape in a position avoiding the opening 66 and a flange portion 61a. The curved surface portion 85 has a lowest point 85a positioned on the lowermost side in a substantially central portion in the front-rear direction and the vehicle width direction.

In the closed region 80, beads 86 linearly extending in the direction inclined to the vehicle-width-direction outer side toward the rear side and intersecting with the virtual line L1 are formed. There are a plurality of beads 86, which are positioned so as to avoid the lowest point 85a of the closed region 80. The plurality of beads 86 include a pair of left and right first bead 86A and second bead 86B formed on a front-half portion of the closed region 80, and a pair of left and right third bead 86C and fourth bead 86D formed on a rear-half portion of the closed region 80.

The beads 86 are provided so as to linearly extend in a direction intersecting with the virtual line L1 at 45 degrees or more. The expression of "45 degrees or more" means that angles from the vehicle-width-direction inner side and the vehicle-width-direction outer side with respect to each of the beads 86 are both within a range of from 45 degrees to 135 degrees. The beads 86 are preferably provided so as to linearly extend in a direction substantially orthogonally intersecting with the virtual line L1. In this description, the expression of "the beads 86 linearly extending in a direction substantially orthogonally intersecting with the virtual line L1" means that the beads 86 linearly extend in a direction intersecting with the virtual line L1 at 90 degrees±15 degrees.

FIG. 8 is a cross-sectional view taken along line VIII-VIII in FIG. 6, and is a cross-sectional view taken along the vehicle width direction passing through the first bead 86A and the second bead 86B. As illustrated in FIG. 8, the first bead 86A and the second bead 86B are formed so as to bulge to the upper side. Although illustration is omitted, the third bead 86C and the fourth bead 86D are also similarly formed so as to bulge to the upper side. Therefore, the beads 86 are formed as high-rigidity portions of which rigidity is higher than that of rest of the portion of the closed region 80.

As illustrated in FIG. 6, the first bead 86A and the third bead 86C are formed as side-sill-side high-rigidity portions positioned to be biased to the side sill 30 side in the vehicle width direction. The second bead 86B and the fourth bead 86D are formed as floor-frame-side high-rigidity portions positioned to be biased to the floor frame 50 side in the vehicle width direction. In other words, each of the plurality of beads 86 is not formed so as to extend across the entire width direction of the closed region 80 and terminates on the way.

The plurality of beads 86 are positioned so as to overlap with each other when seen from the direction of the virtual line L1. In other words, when the closed region 80 is seen from the direction of the virtual line L1, a portion in which the beads 86 are not formed cannot be seen without obstruction other than an end portion on the floor frame 50 side and an end portion on the side sill 30 side. One of the plurality of beads 86 only needs to overlap with at least one of the other beads 86 and does not necessarily need to overlap with all of the other beads 86.

Regarding the plurality of beads 86, the side-sill-side high-rigidity portions and the floor-frame-side high-rigidity portions are alternately arranged in the direction of the virtual line L1. Specifically, in the direction of the virtual line L1, the first bead 86A, the second bead 86B, the third bead 86C, and the fourth bead 86D are arranged in the stated order from the front side.

The second bead 86B positioned to be biased to the floor frame 50 side has an inner end portion 88 positioned on the vehicle-width-direction inner side. The inner end portion 88 is positioned to be spaced apart from the rear flange 13a of the first cross member 10 and the lower flange 52a of the upper frame 51 by 10 mm or more and 15 mm or less. In other words, the second bead 86B is not connected to the first cross member 10 and the floor frame 50 and terminates at a position close to the second corner 82 in the closed region 80.

The third bead 86C positioned to be biased to the side sill 30 side has an outer end portion 89 positioned on the vehicle-width-direction outer side. The outer end portion 89 is positioned to be spaced apart from the front flange 22a of the second cross member 20 and the floor panel flange 65 by 10 mm or more and 15 mm or less. In other words, the third bead 86C is not connected to the second cross member 20 and the side sill 30 and terminates at a position close to the third corner 83 in the closed region 80.

[Joint Member]

As illustrated in FIG. 1, a plurality of joint members 70 are provided on the inner side of the side sill inner portion 31. The joint members 70 define the inner side of the side sill inner portion 31 in the front-rear direction. FIG. 9 is a perspective view of the periphery of the first cross member 10 seen from the rear side, and the side sill 30 is omitted. As illustrated in FIG. 9, the plurality of joint members 70 include a first joint member 71 provided in a position at which the first cross member 10 is connected to the side sill inner portion 31 in the front-rear direction.

With additional reference to FIG. 7 and FIG. 8, a corner reinforcement member 77 that has a L-shape in a cross-section orthogonally intersecting with the front-rear direction is provided on the inner side of the side sill inner portion 31. The corner reinforcement member 77 has an upper wall portion 78 extending in the vehicle width direction along a lower surface of the upper wall portion 33 of the side sill inner portion 31, and a raised wall 79 extending in the up-down direction along the raised wall 32 of the side sill inner portion 31. The corner reinforcement member 77 is joined to the upper wall portion 33 of the side sill inner portion 31 at the upper wall portion 78 and is joined to the raised wall 32 of the side sill inner portion 31 at the raised wall 79.

The first joint member 71 and the corner reinforcement member 77 are formed as reinforcement members that reinforce the raised wall 32 of the side sill inner portion 31 and the corner between the raised wall 32 and the upper wall portion 33.

As illustrated in FIG. 6, the corner reinforcement member 77 extends in the front-rear direction from a front-end portion of the side sill inner portion 31 to a position exceeding the second cross member 20.

FIG. 10 is a perspective view of the first joint member 71 seen from the front side and the vehicle-width-direction outer side, and the hinge pillar 2 and the side sill outer portion 40 are omitted. As illustrated in FIG. 10, the first joint member 71 has a raised wall 72 that extends in a direction orthogonally intersecting with the front-rear direction and defines the inner side of the side sill inner portion 31 in the front-rear direction, an upper flange 73 extending from an upper edge portion thereof to the front side, an inner flange 74 extending from an edge portion of the raised wall 72 on the vehicle-width-direction inner side thereof to the front side, a lower flange 75 extending from a lower edge portion of the raised wall 72 to the front side, and an outer flange 76 extending from an edge portion of the raised wall 72 on the vehicle-width-direction outer side thereof to the rear side.

In the first joint member 71, the upper flange 73, the inner flange 74, and the lower flange 75 extending to the front side are continuously formed. The raised wall 72 has a bead 72a provided in a manner recessed to the rear side in a position offset from a peripheral portion to the inner side. A pair of upper and lower triangular beads 72b are provided between the raised wall 72 and the outer flange 76 in a recessed manner.

As illustrated in FIG. 3, in the first joint member 71, the upper flange 73 is joined to the upper wall portion 33 of the side sill inner portion 31 and the upper wall portion 78 of the corner reinforcement member 77 such that three pieces are put together. In the first joint member 71, the lower flange 75 is joined to the lower wall portion 34 of the side sill inner portion 31.

At an upper portion of the inner flange 74, the first joint member 71 is joined to the raised wall 32 of the side sill inner portion 31 such that three pieces are put together by interposing the raised wall 79 of the corner reinforcement member 77 between the first joint member 71 and the raised wall 32. The first joint member 71 is joined to the outer flange 14 of the first cross member 10 at a lower portion of the inner flange 74 such that three pieces are put together by interposing the raised wall 32 of the side sill inner portion 31 between the first joint member 71 and the outer flange 14, and is joined to the floor panel flange 65 at a place further on the lower side thereof such that three pieces are put together by interposing the raised wall 32 of the side sill inner portion 31 between the first joint member 71 and the floor panel flange 65.

As illustrated in FIG. 7, in the first joint member 71, the outer flange 76 is joined to the hinge pillar inner 3.

As illustrated in FIG. 9, a joined portion at which the corner reinforcement member 77 is joined to the first joint member 71 is formed to have a wider width than the rest of the portion. As illustrated in FIG. 10, in the first joint member 71, joined portions 73a, 74a, and 75a at which the upper flange 73, the outer flange 74, and the lower flange 75 are joined to the side sill inner portion 31 are formed to each have a wider width than unjoined portions 73b, 74b, 75b that are not joined to the side sill inner portion 31. As a result, the increase of the weight is suppressed while enhancing the rigidity by forming the upper flange 73, the outer flange 74, and the lower flange 75 in a continuous manner on the peripheral portion of the raised wall 72 of the first joint member 71.

According to the front vehicle-body structure of the vehicle 1 according to the abovementioned embodiment, the following effects are exhibited.

(1) The beads 86 are provided in the closed region 80 of the floor panel 60 as high-rigidity portions. The beads 86 intersect with the virtual line L1 at an angle of 45 degrees or more, and hence relative displacement that may occur along the virtual line L1 between the inner front region 80a and the outer rear region 80b in the closed region 80 of the floor panel 60 at the time of an oblique collision is suppressed. The stress that may be concentrated on the closed region 80 along the virtual line L1 at the time of a collision is dispersed to the direction intersecting with the virtual line L1 via the beads 86. Therefore, a crack in the closed region 80 of the floor panel 60 at the time of an oblique collision is suitably suppressed.

(2) By the plurality of beads 86, the stress that may be concentrated on the closed region 80 of the floor panel 60 at the time of a collision may be dispersed even more easily to the direction orthogonally intersecting with the virtual line L1. The plurality of beads 86 are not provided across the entire closed region 80, and are provided so as to be positioned to be biased to either the side sill 30 side or the floor frame 50 side, and hence the closed region 80 can be prevented from being excessively reinforced by the plurality of beads 86. As a result, a case where membrane vibration that may occur in at least a part of the closed region 80 spreads to the entire closed region 80 via the plurality of beads 86 can be suppressed. Therefore, the worsening of the NVH in the closed region 80 can be suppressed while providing the plurality of beads 86.

(3) The closed region 80 of the floor panel 60 does not have a portion at which a portion without the beads 86 can be linearly seen without obstruction from the extending direction of the virtual line L1, and hence a crack is not easily developed or generated in the direction along the virtual line L1.

(4) The beads 86 positioned to be biased to the side sill 30 side and the beads 86 positioned to be biased to the floor frame 50 side are alternately provided in the direction of the virtual line L1, and hence the stress that may be concentrated on the closed region 80 of the floor panel 60 at the time of a collision is easily dispersed in a uniform manner in the direction intersecting with the virtual line L1.

(5) The third bead 86C out of the plurality of beads 86 terminates at a portion of which rigidity is relatively high that is the rear portion on the vehicle-width-direction outer side of the closed region 80 of the floor panel 60, in other words, the third corner 83 formed by the side sill 30 and the second cross member 20. As a result, the stress concentration that occurs on the third bead 86C at the time of a collision is easily dispersed to the third corner 83 of which rigidity is relatively high out of the floor panel 60. Therefore, the stress that may occur at the time of a collision can be more suitably dispersed to the closed region 80.

(6) The second bead 86B out of the plurality of beads 86 terminates at a portion of which rigidity is relatively high that is the front portion on the vehicle-width-direction inner side of the closed region 80 of the floor panel 60, in other words, the second corner 82 formed by the floor frame 50 and the first cross member 10. As a result, the stress concentration that occurs on the second bead 86B at the time of a collision is easily dispersed to the second corner 82 of which rigidity is relatively high out of the floor panel 60. Therefore, the stress that may occur at the time of a collision can be more suitably dispersed to the closed region 80.

(7) The plurality of beads 86 are provided in positions avoiding the lowest point 85a of the curved surface portion 85 provided in a curved shape in the closed region 80. As a result, a case where the vibration at the lowest point 85a at which the amplitude of the membrane vibration easily increases in the closed region 80 spreads to the entire closed region 80 via the plurality of beads 86 can be suppressed. Therefore, the worsening of the NVH in the closed region 80 can be suppressed while providing the plurality of beads 86.

(8) When the rigidity of the front portion on the vehicle-width-direction outer side of the closed region 80 is enhanced by firmly fixing the cap member 67 to the opening 66 formed therein, the virtual line L1 is appropriately set, and hence the present disclosure can be suitably carried out.

(9) The high-rigidity portions of which rigidity is enhanced as compared to the rest of the portion of the closed region 80 are formed by the beads 86. As a result, the beads 86 are easily formed by press molding and the like in an easy manner. As compared to a case where the high-rigidity portions are provided by joining different members instead of the beads 86, the increase of the weight of the closed region 80 is suppressed easier. The decrease of the natural frequency due to the weight increase of the closed region 80 can be suppressed, and hence the worsening of the NVH can be suppressed.

(10) When a collision load from the front side that acts on the side sill 30 is transmitted to the vehicle-width-direction inner side via the first cross member 10 at the time of a small overlap collision, the sectional deformation of the side sill 30 can be suppressed by the first joint member 71 and the corner reinforcement member 77. As a result, the collision load is efficiently transmitted to the first cross member 10 and is also transmitted to the floor frame 50 via the first cross member 10, and hence the collision load can be dispersed between the side sill 30, the first cross member 10, and the floor frame 50. The cross-section of the first cross member 10 does not necessarily need to be secured to a place close to the upper surface of the side sill 30. As a result, the deformation of the side sill 30 is suppressed while the increase of weight of the first cross member 10 is suppressed, and the reduction of the vehicle cabin space at the time of a collision is easily suppressed.

In particular, the first cross member 10 is inclined to the vehicle-width-direction inner side toward the rear side, and hence the collision load that acts on the side sill from the front side is easily transmitted to the vehicle-width-direction inner side. In this case, the present disclosure can be carried out more suitably.

(11) The crush of the shape of the corner between the raised wall 32 and the upper wall portion 33 of the side sill inner portion 31 is easily suppressed by the corner reinforcement member 77 while suppressing the out of plane deformation of the raised wall 32 and the upper wall portion 33 of the side sill inner portion 31 by the first joint member 71. Therefore, also at the time of a collision, by the first joint member 71 and the corner reinforcement member 77, the cross-sectional shape of the side sill 30 can be easily maintained, and the collision load can be even more effectively transmitted to the first cross member 10 and the floor frame 50.

(12) The first cross member 10 is joined to the first joint member 71 via the raised wall 32 of the side sill inner portion 31, and hence the collision load is transmitted to the first cross member 10 more effectively via a portion of which sectional deformation is suppressed by the first joint member 71 out of the side sill inner portion 31.

(13) The corner reinforcement member 77 is joined to the side sill inner portion 31 together with the first joint member 71, and hence the sectional deformation of the side sill inner portion 31 is even more easily suppressed by a synergistic effect between the reinforcement effect by the corner reinforcement member 77 and the reinforcement effect by the first joint member 71.

(14) The raised wall 32 of the side sill inner portion 31 is connected to the first cross member 10 at a place below the central position in the up-down direction. Therefore, when an inward falling deformation in which the upper side deforms to the vehicle-width-direction inner side by using the connected lower portion as the starting point easily occurs, the present disclosure is suitably carried out. In other words, the inward falling deformation is associated with the deformation of the cross-section of the side sill inner portion 31. However, according to the present disclosure, the sectional deformation of the side sill inner portion 31 is suppressed by the first joint member 71 and the corner reinforcement member 77, and hence the inward falling deformation of which starting point is the lower portion does not easily occur.

(15) In the side sill 30, the side sill outer portion 40 is formed to have a relatively low buckling load in the front-rear direction as compared to the side sill inner portion 31, and hence deformation is preferentially generated on the side sill outer portion 40 in an easy manner when the retreating front wheel 6 comes into contact with the side sill 30 at the time of a collision. As a result, the retreating front wheel 6 is easily guided to the vehicle-width-direction outer side.

The joined portion 96 of the side sill 30 is positioned to be closer to the vehicle-width-direction inner side than the center line L0 of the wheel 6a in the vehicle width direction. Therefore, the first joined portion 96a positioned on a front end of the joined portion 96 is easily caused to hit the inner side portion of the retreating front wheel 6 in the vehicle width direction first, and the front wheel 6 is easily rotated to the vehicle-width-direction outer side by using the first joined portion 96a as the starting point. As a result, the front wheel 6 is also easily guided to the vehicle-width-direction outer side with respect to the side sill 30.

The retreating front wheel 6 is easily guided to the vehicle-width-direction outer side by the second joined portion 96c inclined to the vehicle-width-direction outer side toward the rear side out of the joined portion 96. Therefore, the contact of the front wheel 6 with the side sill inner portion 31 is suppressed, and hence the deformation of the side sill inner portion 31 positioned on the inner side of the vehicle cabin out of the side sill 30 to the front-rear direction is suppressed. Therefore, at the time of a small overlap collision, the retreating front wheel 6 is easily guided to the vehicle-width-direction outer side of the side sill 30, and a case where the front wheel 6 breaks into the vehicle cabin space side is suppressed. As a result, the reduction of the vehicle cabin space is suppressed. There is no need to provide an additional reinforcement member for catching the retreating front wheel at the time of a small overlap collision, and hence the increase of the number of parts and the increase of weight can be suppressed.

(16) In the front-end portion of the side sill 30, the region of the side sill outer portion 40 is formed to be relatively large. As a result, the collision load is effectively transmitted to the side sill outer portion 40, and deformation is easily generated in a more preferential manner in the side sill outer portion 40.

(17) The side sill outer portion 40 has the inclined wall portion 48a inclined to the vehicle-width-direction outer side toward the rear side, and hence the retreating front wheel 6 is further easily guided to the vehicle-width-direction outer side by the inclined wall portion 48a.

The present disclosure has been described above by providing the abovementioned embodiment, but the present disclosure is not limited to the abovementioned embodiment.

For example, in the abovementioned embodiment, the plurality of beads 86 are formed so as to bulge to the upper side but may be formed so as to bulge to the lower side. However, a case where the plurality of beads 86 bulge to the upper side is preferable because a depressed portion in which electrodeposition coating liquid is easily collected can be prevented from being formed in the closed region 80, for example.

In the abovementioned embodiment, a case where the curved surface portion 85 of the closed region 80 of the floor panel 60 is formed so as to bulge to the lower side in a dome shape has been described as an example, but the present disclosure is not limited thereto. In other words, the present disclosure is also applicable to a case where the curved surface portion 85 is formed so as to bulge to the upper side in a dome shape. In this case, the plurality of beads 86 only need to be formed in a position avoiding the highest point that bulges to the upper side the most out of the curved surface portion 85.

As described above, according to the front vehicle-body structure of the vehicle according to the present disclosure, the collision load in the small overlap collision can be appropriately dispersed to the first cross member from the side sill while suppressing the increase of weight, and hence the front vehicle-body structure is suitably useable in a manufacturing technical field of this type.

What is claimed is:

1. A front vehicle-body structure of a vehicle, the front vehicle-body structure comprising:
   a floor panel;
   a side sill extending in a front-rear direction on a vehicle-width-direction outer end portion of the floor panel, a cross-section of the side sill orthogonally intersecting with the front-rear direction being formed as a closed cross-section;
   a floor frame extending in the front-rear direction on a vehicle-width-direction inner side of the side sill, a cross-section of the floor frame orthogonally intersecting with the front-rear direction being formed as a closed cross-section together with the floor panel; and
   a cross member connecting the side sill and the floor frame to each other in a vehicle width direction, a cross-section of the cross member orthogonally intersecting with the vehicle width direction being formed as a closed cross-section together with the floor panel, wherein
   the side sill has an inner surface, which is positioned on the vehicle-width-direction inner side in the cross-section orthogonally intersecting with the front-rear direction and which extends in an up-down direction, and an upper surface positioned on a top portion and extending in the vehicle width direction;
   a corner extending in the front-rear direction is formed between the inner surface and the upper surface;
   a reinforcement member that reinforces the inner surface and the corner is provided at a position to which the cross member is connected in the front-rear direction on an inner side of the side sill; and
   the reinforcement member includes a corner reinforcement member extending in the front-rear direction along the corner, the corner reinforcement member having an L-shape in a cross-section orthogonally intersecting with the front-rear direction, and being disposed on an inner side of the side sill inner surface; and
   a joint member that defines the inner side of the side sill in the front-rear direction and has a peripheral portion connected to the inner surface and the upper surface, wherein the joint member extends in the left-right direction along an upper wall portion of the corner reinforcement member, and extends in the up-down direction along a raised wall of the corner reinforcement member.

2. The front vehicle-body structure of the vehicle according to claim 1, wherein
   the cross member is connected to the joint member via the side sill inner surface.

3. The front vehicle-body structure of the vehicle according to claim 2, wherein
   the corner reinforcement member is joined to the side sill together with the joint member.

4. The front vehicle-body structure of the vehicle according to claim 3, wherein
   an upper surface portion of the cross member has an end portion connected to the side sill and positioned below a center of the side sill in the up-down direction.

5. The front vehicle-body structure of the vehicle according to claim 1, wherein the cross member has an end portion connected to the side sill and positioned below a center of the side sill in the up-down direction.

6. The front vehicle-body structure of the vehicle according to claim 1, wherein
the corner reinforcement member is joined to the side sill together with the joint member.

7. The front vehicle-body structure of the vehicle according to claim 2, wherein
the cross member has an end portion connected to the side sill and positioned below a center of the side sill in the up-down direction.

8. The front vehicle-body structure of the vehicle according to claim 1, wherein the joint member includes:
a raised wall that extends in a direction orthogonally intersecting with the front-rear direction, and defines an inner portion of the inner side of the side sill in the front-rear direction,
an upper flange extending from an upper edge portion thereof to the front side,
an inner flange extending from an edge portion of the raised wall on the vehicle-width-direction inner side thereof to the front side,
a lower flange extending from a lower edge portion of the raised wall to the front side, and
an outer flange extending from an edge portion of the raised wall on the vehicle-width-direction outer side thereof to the rear side.

9. The front vehicle-body structure of the vehicle according to claim 1, wherein:
the upper wall portion of the corner reinforcement member extends in the vehicle width direction along a lower surface of the side sill upper surface, and
the raised wall of the corner reinforcement member extends in the up-down direction along the inner side of the side sill inner surface.

10. The front vehicle-body structure of the vehicle according to claim 1, wherein
the corner reinforcement member is joined to a lower surface of the side sill upper surface at the upper wall portion and is joined to the inner side of the side sill inner surface at the raised wall.

11. The front vehicle-body structure of the vehicle according to claim 8, wherein:
the upper wall portion of the corner reinforcement member extends in the vehicle width direction along a lower surface of the side sill upper surface, and
the raised wall of the corner reinforcement member extends in the up-down direction along the inner side of the side sill inner surface.

12. The front vehicle-body structure of the vehicle according to claim 8, wherein
the corner reinforcement member is joined to a lower surface of the side sill upper surface and is joined to the inner side of the side sill inner surface.

13. The front vehicle-body structure of the vehicle according to claim 11, wherein
the corner reinforcement member is joined to a lower surface of the side sill upper surface and is joined to the inner side of the side sill inner surface.

14. The front vehicle-body structure of the vehicle according to claim 1, comprising a second cross member connecting the side sill and the floor frame to each other in a vehicle width direction, the second cross member disposed spaced apart from the cross member on the rear side of the cross member;
wherein the corner reinforcement member extends in the front-rear direction from a front-end portion of the corner to a position to the rear of the second cross member.

15. The front vehicle-body structure of the vehicle according to claim 1, wherein the cross member extends in a direction inclined to the rear side toward the vehicle-width-direction inner side, and an end portion joined to an inner portion of the side sill overlaps with a hinge pillar in the front-rear direction when seen from a vehicle-width-direction outer side.

* * * * *